(12) United States Patent
Cui et al.

(10) Patent No.: US 12,105,311 B2
(45) Date of Patent: Oct. 1, 2024

(54) BACKLIGHT MODULE, DISPLAY PANEL AND DISPLAY APPARATUS

(71) Applicants: K-Tronics (Suzhou) Technology Co., Ltd., Jiangsu (CN); BOE Technology Group Co., Ltd., Beijing (CN)

(72) Inventors: Lugui Cui, Beijing (CN); Chuanwei Zhang, Beijing (CN); Xianrong Cheng, Beijing (CN)

(73) Assignees: K-TRONICS (SUZHOU) TECHNOLOGY CO., LTD., Jiangsu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/780,571

(22) PCT Filed: Jun. 4, 2021

(86) PCT No.: PCT/CN2021/098438
§ 371 (c)(1),
(2) Date: May 27, 2022

(87) PCT Pub. No.: WO2021/259044
PCT Pub. Date: Dec. 30, 2021

(65) Prior Publication Data
US 2023/0350123 A1   Nov. 2, 2023

(30) Foreign Application Priority Data
Jun. 22, 2020 (CN) .......................... 202021173417.5

(51) Int. Cl.
F21V 8/00 (2006.01)
G02F 1/1333 (2006.01)
G02F 1/13357 (2006.01)

(52) U.S. Cl.
CPC ..... *G02B 6/0031* (2013.01); *G02F 1/133314* (2021.01); *G02F 1/133615* (2013.01)

(58) Field of Classification Search
CPC ......... G02F 1/133314; G02F 1/133615; G02F 1/133603; G02F 1/133605; G02B 6/0031; G02B 6/0073
See application file for complete search history.

(56) References Cited

U.S. PATENT DOCUMENTS

| 6,480,245 B1 | 11/2002 | Sakamoto et al. | |
| 2012/0120326 A1* | 5/2012 | Takata | G02B 6/0061 348/790 |

(Continued)

FOREIGN PATENT DOCUMENTS

| CN | 102725578 A | 10/2012 |
| CN | 204026361 U | 12/2014 |

(Continued)

*Primary Examiner* — Jia X Pan
(74) *Attorney, Agent, or Firm* — Lippes Mathias LLP (57) ABSTRACT

Provided are a backlight module, a display panel and a display apparatus. The backlight module includes a back plate, including a bottom plate and a frame surrounding the bottom plate; at least one light bar, fixed on an inner sidewall of the frame, wherein a gap is formed between an end portion of the light bar and the inner sidewall of the frame in an extension direction of the light bar; and a reflector sheet, disposed in the frame and on the bottom plate, wherein at least one first sidewall of the reflector sheet is provided with at least one first protrusion, the first protrusion being extended from the first sidewall on which the first protrusion is disposed towards an inner sidewall of the frame opposite to the first sidewall on which the first protrusion is disposed, and the first protrusion being disposed in the gap.

19 Claims, 7 Drawing Sheets

(56) References Cited

U.S. PATENT DOCUMENTS

| | | | |
|---|---|---|---|
| 2013/0155720 A1* | 6/2013 | Kuromizu | G02B 6/009 |
| | | | 362/609 |
| 2013/0188100 A1 | 7/2013 | Ikuta | |
| 2014/0204275 A1* | 7/2014 | Shimizu | G02B 6/0088 |
| | | | 362/609 |
| 2015/0138759 A1 | 5/2015 | Nameda et al. | |
| 2016/0299282 A1* | 10/2016 | Zhou | G02B 6/0031 |
| 2017/0299804 A1 | 10/2017 | Sun et al. | |

FOREIGN PATENT DOCUMENTS

| | | | |
|---|---|---|---|
| CN | 104335110 A | | 2/2015 |
| CN | 204141394 U | | 2/2015 |
| CN | 105093683 A | | 11/2015 |
| CN | 205640365 U | | 10/2016 |
| CN | 205716452 U | | 11/2016 |
| CN | 107340563 A | | 11/2017 |
| CN | 107477436 A | * | 12/2017 |
| CN | 207034993 U | | 2/2018 |
| CN | 212084545 U | | 12/2020 |
| JP | 2008112663 A | | 5/2008 |
| KR | 20080097699 A | | 11/2008 |

\* cited by examiner

BACKLIGHT MODULE, DISPLAY PANEL AND DISPLAY APPARATUS

CROSS-REFERENCE TO RELATED APPLICATION

This application is a 371 of PCT application No. PCT/CN2021/098438, filed on Jun. 4, 2021, which claims priority to Chinese Patent Application No. 202021173417.5, filed on Jun. 22, 2020 and entitled "BACKLIGHT MODULE AND DISPLAY APPARATUS", the disclosures of which are herein incorporated by reference in their entireties.

TECHNICAL FIELD

The present disclosure relates to the field of displays, and in particular relates to a backlight module, a display panel and a display apparatus.

BACKGROUND

A side-type backlight module is a common backlight module, which includes a back plate, a light bar and a reflector sheet. The back plate includes a bottom plate and a frame surrounding the bottom plate. The light bar is disposed on an inner sidewall of the frame, the reflector sheet is disposed in the frame and on the bottom plate, and the light bar is disposed opposite to a side of the reflector sheet. After light from the light bar is emitted from a light-emitting surface of the side-type backlight module, part of light that cannot be emitted out from the light-emitting surface reaches the reflector sheet and is reflected by the reflector sheet, such that the light is emitted from the light-emitting surface of the side-type backlight module again, thereby improving the display luminance.

SUMMARY

Embodiments of the present disclosure provide a backlight module, a display panel and a display apparatus. The technical solutions are as follows.

According to an aspect of the present disclosure, a backlight module is provided. The backlight module includes:

a back plate, including a bottom plate and a frame surrounding the bottom plate; at least one light bar fixed on an inner sidewall of the frame, wherein a gap is formed between an end portion of the light bar and the inner sidewall of the frame in an extension direction of the light bar; and a reflector sheet, disposed in the frame and on the bottom plate, wherein at least one first sidewall of the reflector sheet is provided with at least one first protrusion, the first protrusion is extended from the first sidewall on which the first protrusion is disposed towards the inner sidewall of the frame opposite to the first sidewall on which the first protrusion is disposed, and the first protrusion is disposed in the gap.

In an implementation of the embodiments of the present disclosure, a cutting seam is formed at a connection between the first protrusion and the first sidewall on which the first protrusion is disposed, wherein the cutting seam is extended from a side, proximal to the corresponding light bar, of the first protrusion to a middle of the first protrusion in a first direction, and the first direction is the extension direction of the light bar corresponding to the first protrusion.

In an implementation of the embodiments of the present disclosure, the first sidewall is provided with two first protrusions, and the light bar is disposed between the two first protrusions.

In an implementation of the embodiments of the present disclosure, in the first direction, a length of the cutting seam is smaller than a half of a first length of the first protrusion and greater than a third of the first length of the first protrusion.

In an implementation of the embodiments of the present disclosure, in the first direction, the first length of the first protrusion is greater than a maximum expansion value of the reflector sheet at a predetermined temperature, and the first protrusion and the light bar corresponding to the first protrusion are disposed at the same side of the reflector sheet.

In an implementation of the embodiments of the present disclosure, a second length of the first protrusion is smaller than a first distance, and the first distance is a distance between a side, distal from the inner sidewall on which the light bar is disposed, of the light bar and the inner sidewall in a second direction; and the second direction is perpendicular to the first direction, and parallel to a surface of the reflector sheet.

In an implementation of the embodiments of the present disclosure, the second length is greater than 1.2 mm.

In an implementation of the embodiments of the present disclosure, in the first direction, a distance between the first protrusion and the light bar ranges from 0.3 mm to 0.7 mm.

In an implementation of embodiments of the present disclosure, a number of the light bar and a number of the first sidewall are both 1.

In an implementation of the embodiments of the present disclosure, the at least one light bar incudes a first light bar and a second light bar, wherein the first light bar and the second light bar are disposed on inner sidewalls of two adjacent sides of the frame respectively; and the at least one first sidewall includes two adjacent and mutually-connected first sidewalls, wherein the two first sidewalls are opposite to the first light bar and the second light bar respectively.

In an implementation of the embodiments of the present disclosure, at least one second sidewall of the reflector sheet is provided with a second protrusion facing the inner sidewall of the frame; wherein the second protrusion and the first protrusion are disposed on different sidewalls.

In an implementation of the embodiments of the present disclosure, the second sidewall is provided with two second protrusions spaced apart.

In an implementation of the embodiments of the present disclosure, a distance between the second protrusion and the inner sidewall of the frame opposite to the second protrusion ranges from 0.3 mm to 0.7 mm, and the second protrusion and the inner sidewall of the frame opposite to the second protrusion are disposed at the same side of the reflector sheet.

In an implementation of the embodiments of the present disclosure, the backlight module further includes a light guide plate disposed in the frame; wherein the light guide plate, the reflector sheet and the bottom plate are laminated sequentially.

In an implementation of the embodiments of the present disclosure, the light bar is a blue light bar, and yellow ink is provided on a surface, facing the light guide plate, of the reflector sheet, wherein the yellow ink is disposed at a periphery of the reflector sheet.

In an implementation of the embodiments of the present disclosure, the backlight module further includes an optical film disposed in the frame; wherein the light guide plate is disposed between the reflector sheet and the optical film.

In an implementation of the embodiments of the present disclosure, the optical film includes at least one of a diffusion sheet and a luminance enhancement sheet.

In an implementation of the embodiments of the present disclosure, the backlight module further includes a heat dissipation plate, disposed between the light bar and the inner sidewall of the frame facing the light bar.

According to another aspect of the present disclosure, a display panel is provided. The display panel includes a display substrate and the backlight module according to any one of the above aspects.

According to still another aspect of the present disclosure, a display apparatus is provided. The display apparatus includes a power supply component and the display panel according to any one of the above aspects. The power supply component is configured to supply power for the display panel.

DETAILED DESCRIPTION

For clearer descriptions of the objectives, technical solutions, and advantages of the present disclosure, the embodiments of the present disclosure are described in detail hereinafter with reference to the accompanying drawings.

In the related art, there is a certain distance between the reflector sheet and the inner sidewall of the frame. When the reflector sheet is expanded, the size of the reflector sheet becomes larger, and the distance between the reflector sheet and the inner sidewall of the frame provides a certain space for the expansion of the reflector sheet, such that the reflector sheet is prevented from abutting against the frame of the back plate, thereby avoiding damage to the reflector sheet.

It is found in studies that the reflector sheet is manufactured by stretching in a high temperature condition, and thus the reflector sheet shrinks at the high temperature and has different shrinkage amounts in different directions.

By taking a 65-inch reflector sheet as an example, the length of the 65-inch reflector sheet is 1440 mm, and the width of the 65-inch reflector sheet is 810 mm. The reflector sheet shrinks at 80 centigrade (° C.). Here, the shrinkage value (a difference value between the length before shrinking and the length after shrinking) of the reflector sheet in a machine direction (MD) is 4.32 mm, and the shrinkage ratio (a ratio of the shrinkage value to the length before shrinking) is 0.30%; and the shrinkage value of the reflector sheet in a transverse direction (TD) is 0.648 mm, and the shrinkage ratio is 0.08%.

Although the gap between the reflector sheet and the inner sidewall of the frame may prevent the reflector sheet from being damaged by the expansion of the reflector sheet, when the reflector sheet shrinks, the distance between the reflector sheet and the inner sidewall of the frame increases, resulting in an excessive movement range of the reflector sheet. When the reflector sheet moves, the region of the reflector sheet that can reflect light may be reduced, which not only affects the emission amount of the light, but also causes the display non-uniformity, thereby affecting the display luminance and the display effect of the display panel.

Figure 1:
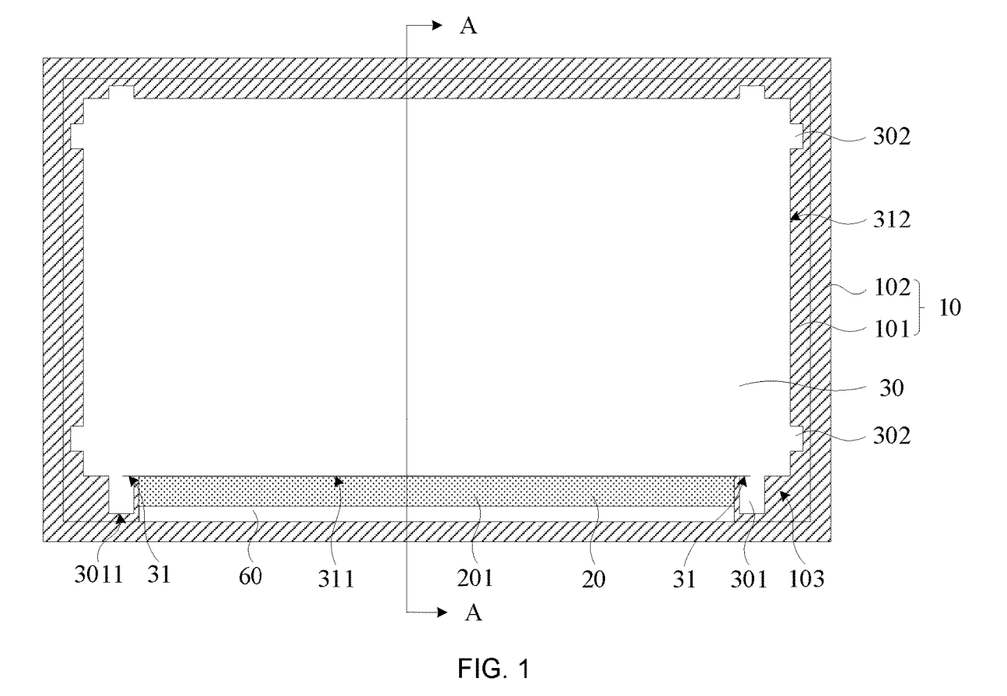
FIG. 1 is a top view of a backlight module according to an embodiment of the present disclosure.

FIG. 1 is a top view of a backlight module according to an embodiment of the present disclosure. Referring to FIG. 1, the backlight module includes a back plate 10, a light bar 20 and a reflector sheet 30.

The back plate 10 includes a bottom plate 101 and a frame 102 surrounding the bottom plate 101. The light bar 20 is fixed on an inner sidewall of the frame 102, and a gap 103 is formed between an end portion of the light bar 20 and the inner sidewall of the frame 102 in an extension direction of the light bar 20. The reflector sheet 30 is disposed in the frame 102 and on the bottom plate 101. A first sidewall 311 of the reflector sheet 30 is provided with at least one first protrusion 301. The first protrusion 301 is extended from the first sidewall 311 on which the first protrusion 301 is disposed towards the inner sidewall of the frame 102 opposite to the first sidewall 311 on which the first protrusion 301 is disposed, and the first protrusion 301 is disposed in the gap 103.

Figure 2:
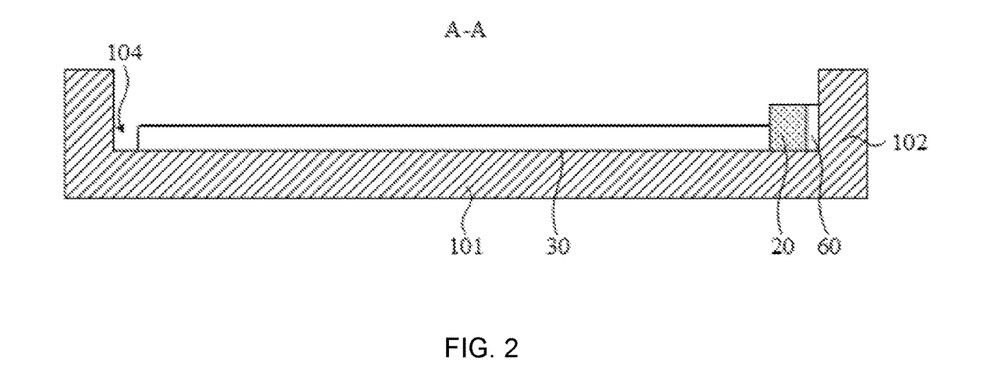
FIG. 2 is a sectional view of the section A-A in FIG. 1.

FIG. 2 is a sectional view of the section A-A in FIG. 1. Referring to FIG. 2, the reflector sheet 30 is disposed on the bottom plate 101, an accommodation space 104 is formed between the bottom plate 101 and the frame 102, and the light bar 20 and the reflector sheet 30 are disposed in the accommodation space 104.

In the embodiments of the present disclosure, the reflector sheet is disposed in the frame of the back plate. When the reflector sheet shrinks, the periphery of the reflector sheet shrinks towards the center of the reflector sheet, such that the size of the reflector sheet becomes smaller, the distance between the reflector sheet and the inner sidewall of the frame becomes larger, and the movable range of the reflector sheet is larger. When the reflector sheet moves beyond a certain range, an overlapping region between the reflector sheet and the light guide plate at a side of the reflector sheet becomes smaller, such that the region of the reflector sheet that can reflect light is reduced, which affects the emission amount of the light and causes the display non-uniformity. The first protrusion is disposed on the first sidewall of the reflector sheet and the first protrusion is in the gap between the end portion of the light bar and the inner sidewall of the frame. Therefore, when the reflector sheet moves in the extension direction of the light bar, the first protrusion abuts against the end portion of the light bar, such that the movement range of the reflector sheet is limited by the light bar and the region of the reflector sheet that can reflect light is prevented from being reduced due to the excessive movement of the reflector sheet, thereby ensuring the emission amount of the light and the display uniformity, and improving the display luminance and the display effect of the display panel.

Figure 3:
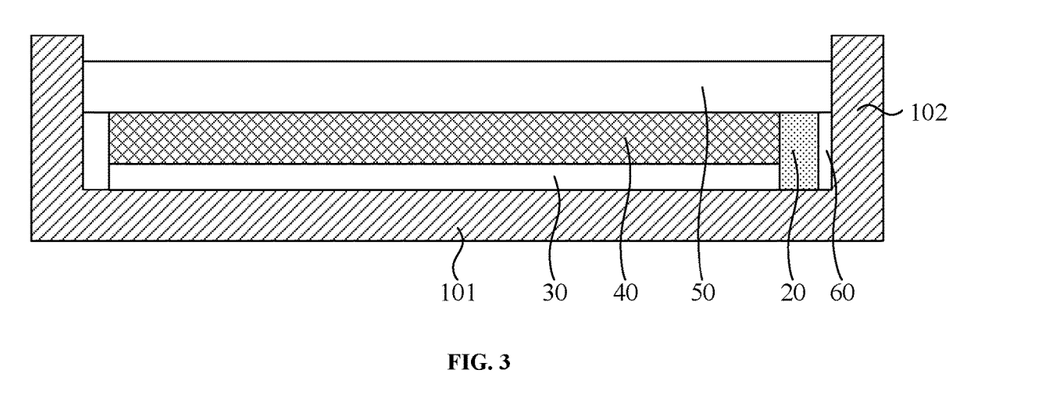
FIG. 3 is a sectional view of a backlight module an embodiment of the present disclosure.

FIG. 3 is a sectional view of a backlight module according to an embodiment of the present disclosure. Referring to FIG. 3, the backlight module further includes a light guide plate 40. The light guide plate 40 is disposed in the frame 102, and the light guide plate 40, the reflector sheet 30 and the bottom plate 101 are laminated sequentially, that is, the reflector sheet 30 is disposed between the bottom plate 101 and the light guide plate 40.

In the embodiments of the present disclosure, the bottom plate 101 of the back plate 10 is configured to support structures such as the reflector sheet 30 and the light guide plate 40, and the frame 102 of the back plate 10 is configured to mount the light bar 20. The light bar 20 is fixed on the inner sidewall of the frame 102, a light-emitting surface of the light bar 20 faces the light guide plate 40. The light guide plate 40 converts light emitted by the light bar 20 into a surface light source, such that the light is distributed more uniformly on the light-emitting surface of the display panel, thereby improving the display effect. As the reflector sheet 30 is disposed under the light guide plate 40, when part of the light passing through the light guide plate 40 reaches the reflector sheet 30, the reflector sheet 30 reflects the light to the light guide plate 40 again, and the light is emitted out from the light guide plate 40 again, thereby improving the display luminance.

In the embodiments of the present disclosure, the light bar 20 is fixed on the inner sidewall of the frame 102, that is, the light emitted by the light bar 20 enters the light guide plate 40 from a side surface of the light guide plate 40. Therefore, the backlight module is a side-type backlight module.

Exemplarily, in the embodiment of the present disclosure, the bottom plate 101 is a rectangular bottom plate, and the frame 102 is a rectangular frame, which is disposed along the periphery of the bottom plate 101. In other embodiments, the bottom plate 101 and the frame 102 may also be in other shapes, such as a circular bottom plate and a circular frame, which is not limited in the present disclosure.

Optionally, the bottom plate 101 and the frame 102 may be of an integral structure, or fixed together by welding, or the like.

In the embodiments of the present disclosure, the light bar 20 may be fixed on the inner sidewall of the frame 102 by bonding, or the like.

In the embodiments of the present disclosure, shapes of the reflector sheet 30 and the light guide plate 40 match with shapes of the bottom plate and the frame. For example, in the case that the bottom plate 101 is a rectangular bottom plate and the frame 102 is a rectangular frame, the light guide plate 40 is also rectangular, and the reflector sheet 30 is approximately rectangular.

Optionally, the reflector sheet 30 may be a metal reflector sheet, and the light guide plate 40 may be a light guide plate made of polymethyl methacrylate, or a light guide plate made of polycarbonate.

Optionally, the reflector sheet 30 includes a reflecting surface and a sidewall connected to the reflecting surface. The reflecting surface may be a surface, opposite to the light guide plate 40, of the reflector sheet 30, and the sidewall of the reflector sheet 30 is opposite to the inner sidewall of the frame. In the embodiments of the present disclosure, the first protrusion 301 is disposed on at least one sidewall of the reflector sheet 30.

In a possible implementation, the backlight module includes only one light bar 20, and only one sidewall of the reflector sheet 30 is provided with the first protrusion 301.

As shown in FIG. 1, the number of the light bar 20 and the number of first sidewall 311 are both 1. The light bar 20 is a first light bar 201. The first protrusion 301 is disposed on the first sidewall 311, a gap 103 is formed between an end portion of the first light bar 201 and the inner sidewall of the frame 102, and the first protrusion 301 is disposed in the gap 103.

In this implementation, the backlight module is provided with one light bar, i.e., the first light bar 201, and the first sidewall 311 corresponding to the first light bar 201 is provided with the first protrusion 301. When the reflector sheet 30 moves in the extension direction of the first light bar 201, the first protrusion 301 abuts against the end portion of the first light bar 201 to prevent the excessive movement of the reflector sheet 30 in the extension direction of the first light bar 201, thereby preventing the display luminance and the display effect of the display panel from be affected.

In the embodiments of the present disclosure, when the backlight module is provided with only one light bar, i.e., the first light bar 201, the machine direction of the reflector sheet 30 is consistent with the extension direction of the first light bar 201, that is, the reflector sheet 30 shrinks more obviously in the extension direction of the first light bar 201. Therefore, by arranging the first protrusion 301 on the first sidewall 311 corresponding to the first light bar 201, the movement of the reflector sheet 30 in the extension direction of the first light bar 201 can be limited, thereby avoiding display problems caused by the excessive movement of the reflector sheet 30 resulted from an excessive heat shrinkage of the reflector sheet 30.

In another implementation of the embodiments of the present disclosure, the backlight module includes two light bars 20, which are disposed on inner sidewalls of two adjacent sides of the frame 102 respectively. Correspondingly, sidewalls, opposite to the two inner sidewalls, of the reflector sheet 30 are both provided with the first protrusions 301.

Figure 4:
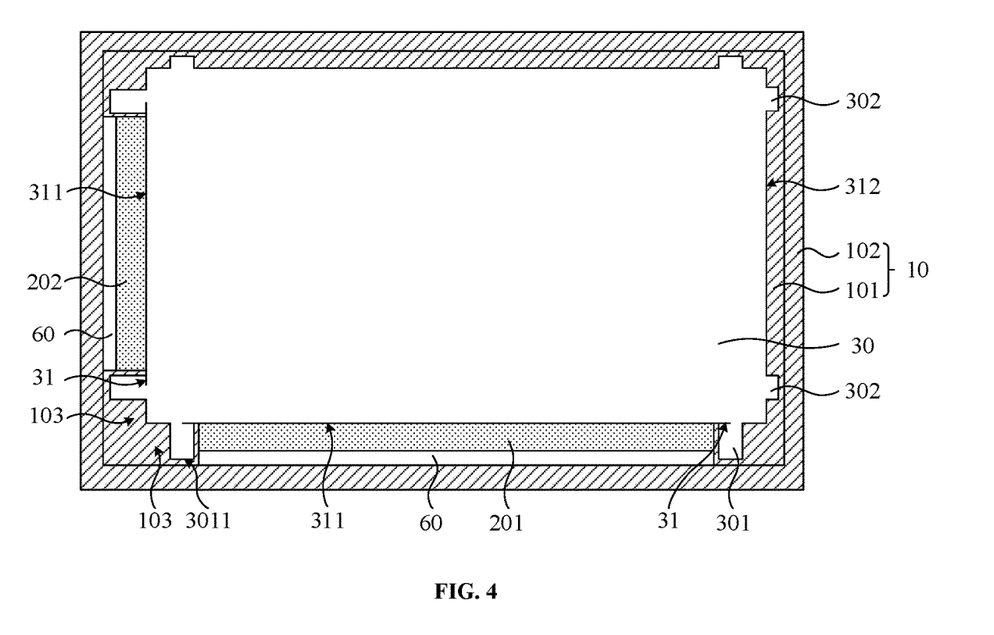
FIG. 4 is a top view of another backlight module according to an embodiment of the present disclosure.

FIG. 4 is a top view of another backlight module according to an embodiment of the present disclosure. Referring to FIG. 4, the light bars 20 may include a first light bar 201 and a second light bar 202, and the first light bar 201 and the second light bar 202 are disposed on the inner sidewalls of two adjacent sides of the frame 102 respectively.

The first sidewalls 311 include two adjacent and connected first sidewalls 311, and the two first sidewalls 311 are opposite to the first light bar 201 and the second light bar 202 respectively.

As shown in FIG. 4, a gap 103 is formed between the end portion of the first light bar 201 and the inner sidewall of the frame 102, and the first protrusion 301 on the first sidewall 311 corresponding to the first light bar 201 is disposed in the gap 103. A gap 103 is also formed between the end portion of the second light bar 202 and the inner sidewall of the frame 102, and the first protrusion 301 on the first sidewall 311 corresponding to the second light bar 202 is disposed in the gap 103.

In this implementation, the backlight module is provided with two light bars 20, i.e., the first light bar 201 and the second light bar 202, which can improve the luminance of the display panel. Additionally, the first sidewall 311 corresponding to the first light bar 201 is provided with the first protrusion 301, and the first sidewall 311 corresponding to the second light bar 202 is also provided with the first protrusion 301. Therefore, when the reflector sheet 30 moves in the extension direction of the first light bar 201, the first protrusion 301 on the first sidewall 311 corresponding to the first light bar 201 abuts against the end portion of the first light bar 201; and when the reflector sheet 30 moves in the extension direction of the second light bar 202, the first protrusion 301 on the first sidewall 311 corresponding to the second light bar 202 abuts against the end portion of the second light bar 202. The first light bar 201 and the second light bar 202 are disposed on two adjacent inner sidewalls of the frame 102 respectively, that is, the extension direction of the first light bar 201 and the extension direction of the second light bar 202 are different. Thus, the movement of the reflector sheet 30 can be limited in two directions simultaneously to achieve a better effect of limiting the reflector sheet 30.

In the embodiments of the present disclosure, the extension direction of the first light bar 201 is consistent with the machine direction of the reflector sheet 30, and the extension direction of the second light bar 202 is consistent with the transverse direction of the reflector sheet 30. Thus, the movement of the reflector sheet 30 can be limited in the machine direction and the transverse direction simultaneously to enhance the effect of limiting the reflector sheet 30 and prevent the movement of the reflector sheet 30 from affecting the display effect.

Referring to FIG. 1 and FIG. 4 again, two first protrusions 301 are provided on one first sidewall 311 of the reflector sheet 30, and the light bar 20 is disposed between the two first protrusions 301.

In this implementation, two first protrusions 301 are disposed on the first sidewall 311 and are at two ends of the light bar 20 respectively. When the reflector sheet 30 moves, both first protrusions 301 abut against the end portions of the light bar 20 to enhance the effect of limiting the reflector sheet 30.

Figure 5:
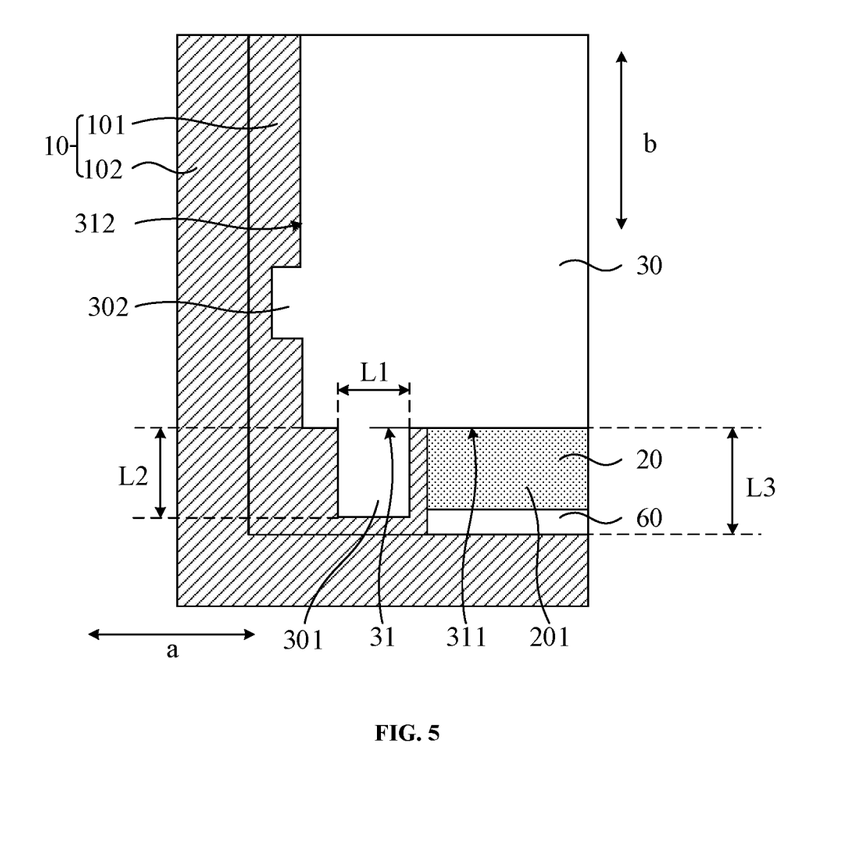
FIG. 5 is a partial schematic diagram of the backlight module in FIG. 1.

FIG. 5 is a partial schematic diagram of the backlight module in FIG. 1, and FIG. 5 shows the lower left corner in FIG. 1.

Referring to FIG. 5, a first length L1 of the first protrusion 301 in a first direction is greater than a maximum expansion value of the reflector sheet 30 at a predetermined temperature in the first direction. The first direction is the extension direction of the light bar 20 corresponding to the first protrusion 301, that is, the direction a in FIG. 5. The first protrusion 301 and the light bar 20 corresponding to the first protrusion 301 are disposed at the same side of the reflector sheet 30. For example, for a 65-inch reflector sheet, the length of the first protrusion 301 in the first direction is greater than 5 mm.

In this implementation, the length of the first protrusion 301 in the first direction is limited to ensure the size and strength of the first protrusion 301, and prevent the first protrusion 301 from being damaged due to an excessive pressure of the end portion of the light bar 20 applied on the first protrusion 301 when the first protrusion 301 abuts against the end portion of the light bar 20.

In the embodiments of the present disclosure, the maximum expansion value of the reflector sheet 30 at the predetermined temperature in the first direction refers to a difference value between the length of the reflector sheet 30 before expansion in the first direction and the maximum length of the reflector sheet 30 after expansion in the first direction. Here, the predetermined temperature may be a temperature at which the expansion value of the reflector sheet is maximum in an operation state of the backlight module. For example, the predetermined temperature ranges from 75° C. to 85° C.

In the embodiments of the present disclosure, the first protrusion 301 is a columnar protrusion having two opposite end surfaces and a side surface connecting the two end surfaces. One end surface is connected to the first sidewall, and the other end surface is opposite to the inner sidewall of the frame. Exemplarily, a cross section of the columnar protrusion may be rectangular, circular, polygonal, or the like. In other implementations, the first protrusion 301 may also be a pyramid-shaped protrusion, or the like, which is not limited in the present disclosure.

Figure 6:
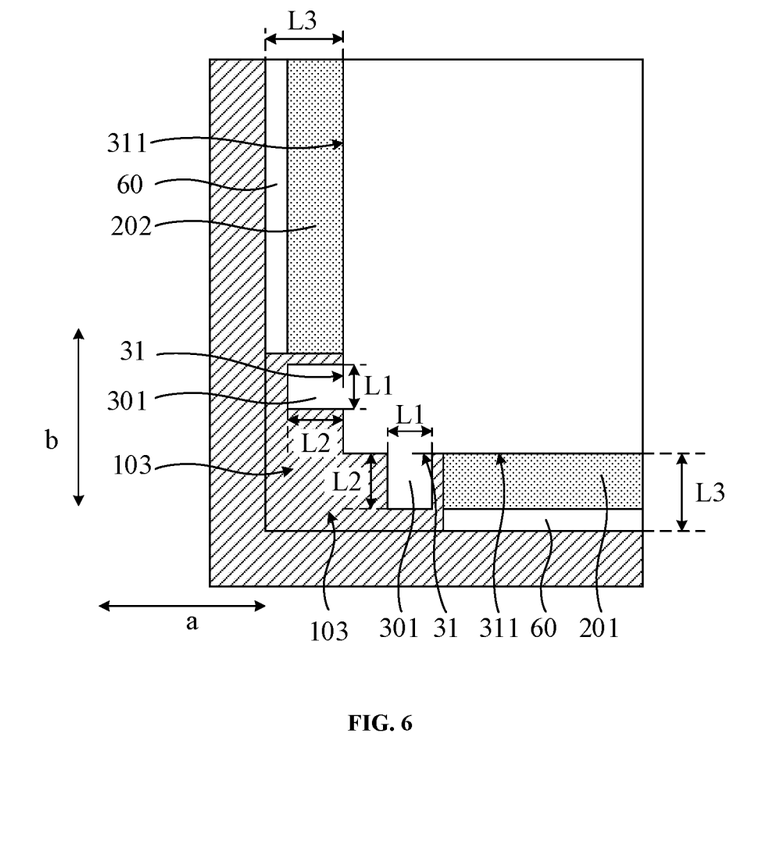
FIG. 6 is a partial schematic diagram of the backlight module in FIG. 4.
Figure 7:
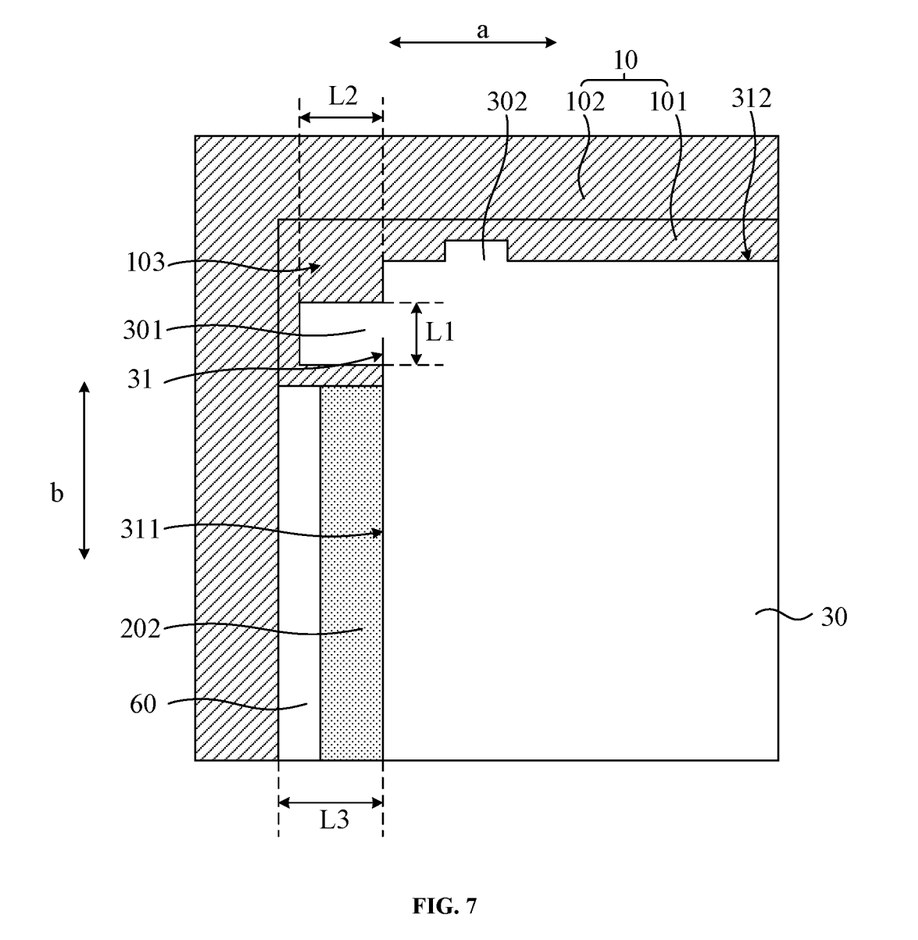
FIG. 7 is a partial schematic diagram of the backlight module in FIG. 4.

FIG. 6 is a partial schematic diagram of the backlight module in FIG. 4, and FIG. 6 shows a partial top view of the lower left corner in FIG. 4. FIG. 7 is a partial schematic diagram of the backlight module in FIG. 4, and FIG. 7 shows a partial schematic diagram of the upper left corner in FIG. 4. Two light bars are provided in the embodiments shown in FIG. 6 and FIG. 7, the extension direction of the first light bar 201 is a direction a, and the extension direction of the second light bar 202 is a direction b. Therefore, the direction a and the direction b are both the first direction described above in the embodiments shown in FIG. 6 and FIG. 7.

Referring to FIG. 5 to FIG. 7 again, a second length L2 of the first protrusion 301 in a second direction is smaller than a first distance L3, and the first distance L3 is the distance between a side, distal from the inner sidewall on which the light bar 20 is disposed, of the light bar 20 and the inner sidewall. The second direction is perpendicular to the first direction and parallel to the surface of the reflector sheet 30.

In the embodiments of the present disclosure, the second length L2 of the first protrusion 301 is the size of the first protrusion 301 in the second direction.

In this implementation, the second length L2 of the first protrusion 301 is limited to be smaller than the first distance L3, so as to prevent the first protrusion 301 from abutting against the inner sidewall of the frame 102 due to the too large second length L2 of the first protrusion 301, thereby avoiding the twist deformation or damage of the reflector sheet 30.

As shown in FIG. 5 to FIG. 7, when the first protrusion 301 is disposed at different positions, the first direction and the second direction corresponding to the first protrusion 301 are also different. For the first protrusion 301 corresponding to the first light bar 201, the first direction is the direction a, and the second direction is the direction b; for the first protrusion 301 corresponding to the second light bar 202, the first direction is the direction b, and the second direction is the direction a.

In an implementation of the embodiments of the present disclosure, the second length L2 of the first protrusion 301 in the second direction is greater than 1.2 mm.

In this implementation, the second length L2 of the first protrusion 301 is limited, to prevent the second length L2 of the first protrusion 301 from being too small. In this way, when the reflector sheet 30 moves, the first protrusion 301 does not fall off from the distance between the end portion of the light bar 20 and the inner sidewall of the frame 102, thereby limiting the light bar 20 in the extension direction thereof.

In the embodiments of the present disclosure, the light bar 20 is a long strip-shaped light bar. Exemplarily, the light bar 20 may be a light-emitting diode (LED) light bar. The light bar 20 includes an LED and a printed circuit board (PCB), and the LED is welded on the PCB. A control unit of the display panel sends signals to the LED through the PCB to control the luminance of the LED, thereby controlling the backlight module to be turned on or turned off.

Optionally, the PCB may be a copper clad aluminum substrate. In other embodiments, a PCB in other forms may also be adopted, as long as the light bar and the control unit can be an electrical connected.

Referring to FIG. 1 to FIG. 7 again, optionally, the backlight module further includes a heat dissipation plate 60 disposed between the light bar 20 and the inner sidewall of the frame 20 facing the light bar 20.

The heat dissipation plate 60 is configured to mount the light bar 20, to fix the light bar 20 on the inner sidewall of the frame 102.

Optionally, the light bar 20 is bonded with the heat dissipation plate 60 by a thermally conductive adhesive, and then the heat dissipation plate 60 is bonded with the inner sidewall of the frame 102 by the thermally conductive adhesive, so as to fix the light bar 20 on the inner sidewall of the frame 102. Additionally, heat generated during operation of the light bar 20 is conducted to the back plate 10 through the thermally conductive adhesive and the heat dissipation plate 60, and then the back plate 10 conducts the heat into air, thereby dissipating heat for the light bar 20 and preventing the backlight module from being damaged by the excessively high temperature.

Optionally, the heat dissipation plate 60 is an aluminum heat dissipation plate. The aluminum heat dissipation plate has good thermal conductivity, which can ensure the heat dissipation function of the heat dissipation plate 60.

In the embodiments of the present disclosure, in the second direction, the second length L2 of the first protrusion 301 is smaller than a sum of the thickness of the heat dissipation plate 60 and the thickness of the light bar 20 (the sum of the thicknesses is equal to the distance between the side, distal from the inner sidewall on which the light bar 20 is disposed, of the light bar 20 and the inner sidewall, i.e., the first distance L3), such that the first protrusion 301 is prevented from abutting against the inner sidewall of the frame 102, thereby avoiding the twist deformation or damage of the reflector sheet 30.

Exemplarily, in the second direction, the thickness of the heat dissipation plate 60 ranges from 2 mm to 2.5 mm.

For example, in the second direction, the thickness of the heat dissipation plate 60 is 2 mm, the thickness of the light bar 20 is 1.7 mm, and the second length L2 of the first protrusion 301 should be smaller than 3.7 mm. For example, the second length L2 of the first protrusion 301 may be 3 mm.

Referring to FIG. 5 to FIG. 7 again, a cutting seam 31 is formed at the connection between the first protrusion 301 and the first sidewall 311 on which the first protrusion 301 is disposed. In the first direction, the cutting seam 31 is extended from a side, proximal to the corresponding light bar 20, of the first protrusion 301 to approximately a middle of the first protrusion 301. Here, the cutting seam 31 partially cuts off the connection between the first protrusion 301 and the first sidewall 311.

In this implementation, when the reflector sheet 30 shrinks, the first protrusion 301 abuts against the end portion of the light bar 20, such that the end portion of the light bar 20 squeezes the first protrusion 301. The cutting seam 31 is provided to partially cut off the connection between the first protrusion 301 and the first sidewall 311, and the cutting seam 31 is proximal to one end of the light bar 20. Thus, when the end portion of the light bar 20 squeezes the first protrusion 301, the first protrusion 301 may be slightly upwarped or folded, such that the first protrusion 301 has certain elasticity, thereby preventing the first protrusion 301 from being damaged and preventing the twist deformation or damage of the reflector sheet 30 due to an excessive squeezing force applied on the first protrusion 301. As the reflector sheet 30 has certain hardness and elasticity, the first protrusion 301 may be slowly restored to the original state when the reflector sheet 30 is restored.

In an implementation of the embodiments of the present disclosure, in the first direction, the length of the cutting seam 31 is smaller a half of a first length L1 of the first protrusion 301, and greater than a third of the first length L1 of the first protrusion 301.

In the embodiments of the present disclosure, the first length L1 of the first protrusion 301 is the size of the first protrusion 301 in the first direction.

In this implementation, the length of the cutting seam 31 is ensured by limiting the length thereof. When the reflector sheet 30 shrinks, the first protrusion 301 may be folded sufficiently to prevent the first protrusion 301 from being damaged due to the excessive squeezing force. In addition, the connection strength of the first protrusion 301 is prevented from being affected due to the too long cutting seam 31, thereby preventing the first protrusion 301 from being damaged during folding.

In the embodiments of the present disclosure, the cutting seam 31 and the boundary at the side, proximal to the light bar 20, of the reflector sheet 30 (generally referred to as a ground side) are cut simultaneously. As shown in FIG. 1, when the boundary of the reflector sheet is cut, the cutting seam 31 and the sidewall 3011, proximal to the frame 102, of the first protrusion 301 are cut simultaneously. During cutting, the sidewall 3011 of the first protrusion 301 and the cutting seam 31 of the first protrusion 301 are cut simultaneously by using two parallel blades. There is a certain distance between the two blades. When the cutting seam 31 is set, the length of the first protrusion 301 in the second direction should be greater than the distance between the two blades, to facilitate setting of the cutting seam 31.

Exemplarily, the distance between two blades may be related to the process precision. Therefore, the distance between the two blades may be firstly determined based on the process precision, and then the length of the first protrusion 301 in the second direction may be determined based on the distance between the two blades.

In an implementation of the embodiments of the present disclosure, in the first direction, the distance between the first protrusion 301 and the light bar 20 ranges from 0.3 mm to 0.7 mm.

In this implementation, the distance between the first protrusion 301 and the light bar 20 facilitates assembly on the one hand and ensures a certain shrinkage amount of the reflector sheet 30 on the other hand. When the reflector sheet 30 shrinks, the first protrusion 301 does not abut against the end portion of the light bar 20 excessively, thereby avoiding the twist deformation of the reflector sheet 30.

Exemplarily, the distance between the first protrusion 301 and the light bar 20 may be 0.5 mm.

Referring to FIG. 1 and FIG. 4 again, at least one second sidewall 312 of the reflector sheet 30 is provided with a second protrusion 302 facing the inner sidewall of the frame 102. The second protrusion 302 and the first protrusion 301 are disposed on different sidewalls.

In this implementation, the second sidewall 312 is provided with the second protrusion 302. When the reflector sheet 30 moves, the second protrusion 302 is in contact with the inner sidewall of the frame 102, which can avoid the display effect from being affected due to the excessive movement range of the reflector sheet 30.

Additionally, due to the presence of the second protrusion 302, a groove opposite to the second protrusion 302 is formed in the second sidewall 312 of the reflector sheet 30, and there is a certain distance between the groove and the inner sidewall of the frame 102. When the reflector sheet 30 expands, the distance may provide a certain expansion amount for the reflector sheet 30 to prevent the second sidewall 312 of the reflector sheet 30 from completely abutting against the inner sidewall of the frame 102, thereby avoiding the twist deformation or damage of the reflector sheet 30.

In the embodiments of the present disclosure, the second protrusion 302 is a columnar protrusion. Exemplarily, a cross section of the columnar protrusion may be rectangular, circular, polygonal, or the like. In other implementations, the second protrusion 302 may also be a pyramid-shaped protrusion, or the like, which is not limited in the present disclosure.

Referring to FIG. 1 and FIG. 4 again, the second sidewall 312 is provided with two second protrusions 302 spaced apart.

In this implementation, two second protrusions 302 are disposed on the second sidewall 312 and the two second protrusions 302 are spaced apart, to improve the function of limiting the reflector sheet 30 and avoid the reflector sheet 30 from tilting during movement.

In other implementations, the second sidewall 312 may also include one or more second protrusions 302.

Figure 8:
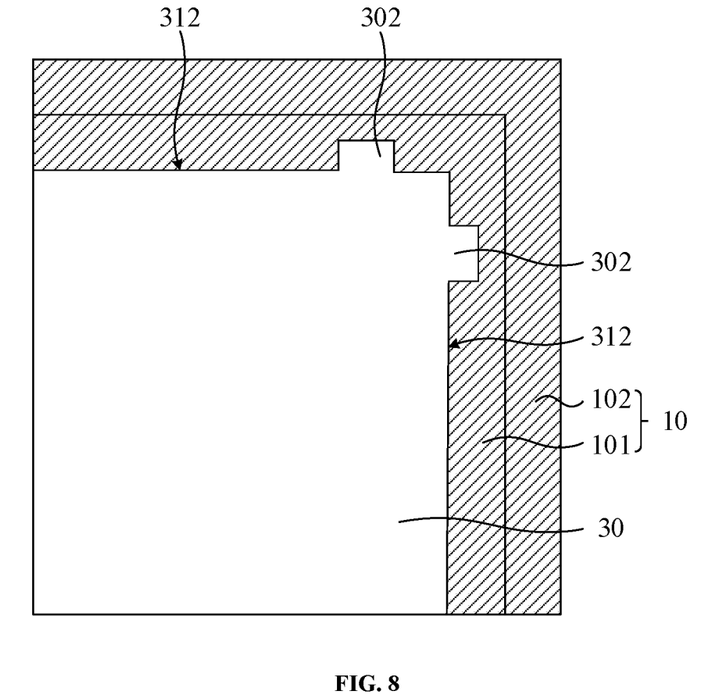
FIG. 8 is a partial top view of a backlight module according to an embodiment of the present disclosure.

FIG. 8 is a partial top view of a backlight module according to an embodiment of the present disclosure. Referring to FIG. 8, the second protrusion 302 is disposed at a periphery of the second sidewall 312.

In an implementation of the embodiments of the present disclosure, the distance between the second protrusion 302 and the inner sidewall of the frame 102 opposite to the second protrusion 302 ranges from 0.3 mm to 0.7 mm, and the second protrusion 302 and the inner sidewall of the frame 102 opposite to the second protrusion 302 are disposed at the same side of the reflector sheet 30.

In this implementation, on the one hand, the certain distance between the second protrusion 302 and the inner sidewall of the frame 102 facilitates assembly. On the other hand, when the reflector sheet 30 expands, the size of the reflector sheet 30 becomes larger, and the certain distance between the second protrusion 302 and the frame 102 provides a certain space for the expansion of the reflector sheet 30, such that the reflector sheet 30 does not abut against the frame 102, thereby preventing the reflector sheet 30 from being damaged.

Exemplarily, the distance between the second protrusion 302 and the inner sidewall of the frame 102 opposite to the second protrusion 302 may be 0.5 mm. The ground side of the reflector sheet 30 is in direct contact with the light bar 20, that is, the reflector sheet 30 cannot move to the ground side. Therefore, a movable amount of the reflector sheet 30 in a left-right direction (machine direction) is 1 mm, and a movable amount of the reflector sheet 30 in an up-down direction (transverse direction) is 0.5 mm.

In the embodiments of the present disclosure, the movable amount of the reflector sheet 30 may be taken as an expansion allowance of the reflector sheet 30, to prevent the reflector sheet 30 from abutting against the frame 102, thereby preventing the reflector sheet 30 from being damaged.

In the related art, the reflector sheet 30 has a movement range in both the left-right direction and the up-down direction. When the reflector sheet 30 moves to the left, the area of the reflector sheet 30 at the right side of the display panel is reduced, and the light at the right side of the display panel becomes less, such that the right side is darkened; when the reflector sheet 30 moves to the right, the area of the reflector sheet 30 at the left side of the display panel is reduced, and the light at the left side of the display panel becomes less, such that the left side is darkened; when the reflector sheet 30 moves upward, the area of the reflector sheet 30 at the ground side of the display panel is reduced, and the ground side of the display panel is directly opposite to the light bar, which affects the display effect of the ground side of the display panel and results in light shadows at the ground side of the display panel. In the backlight module according to the embodiments of the present disclosure, the first sidewall 311 is provided with the first protrusion 301 to limit the movement of the reflector sheet 30, thereby avoiding the occurrence of such phenomenon.

In an implementation of the embodiments of the present disclosure, the light bar 20 is a blue light bar.

Figure 9:
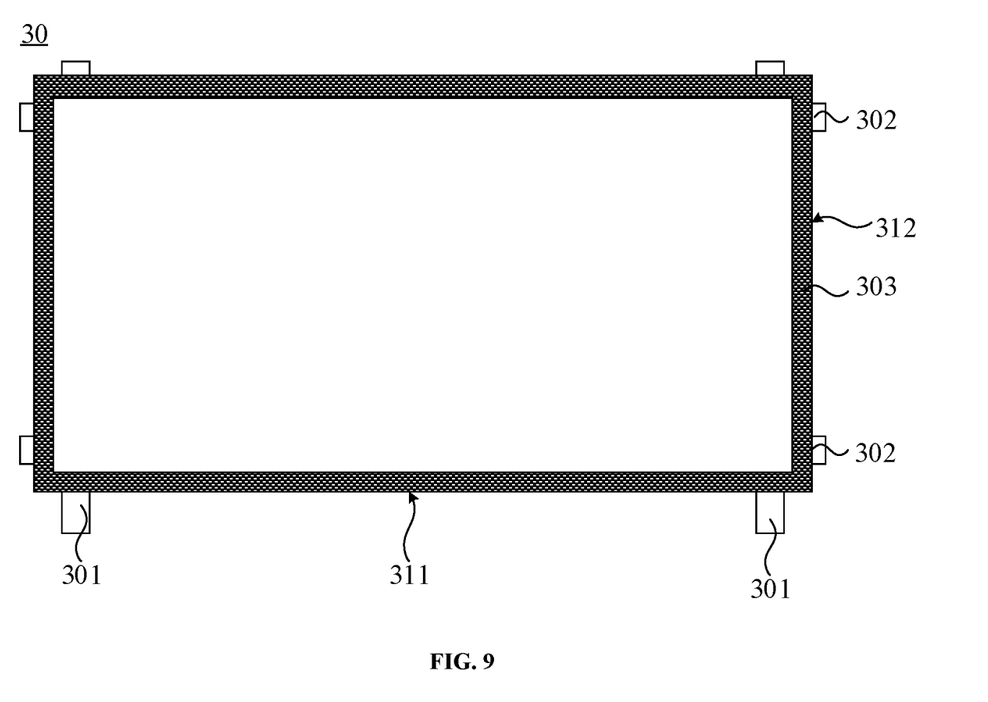
FIG. 9 is a top view of a reflector sheet according to an embodiment of the present disclosure.

FIG. 9 is a top view of a reflector sheet according to an embodiment of the present disclosure. Referring to FIG. 9, yellow ink 303 is provided on the surface, facing the light guide plate 40, of the reflector sheet 30, and the yellow ink 303 is disposed at the periphery of the reflector sheet 30.

In this implementation, as the yellow ink 303 is disposed at the periphery of the reflector sheet 30, when blue light reaches the periphery of the reflector sheet 30, the blue light turns into white light after passing through the yellow ink 303 on the reflector sheet 30, and is emitted from the periphery of the display panel. Compared with the blue light, the white light is not easily perceived. Therefore, even if the display panel leaks light, it's not easily perceived, thereby avoiding affecting the display effect.

In the related art, the blue light with the same intensity displays as blue after passing through the yellow ink with a lower density, and displays as yellow when passing through the yellow ink with a higher density. Therefore, for light with different intensities, yellow ink with different densities needs to be set such that the reflected light is white. Due to the structure of the light guide plate 40, the intensities of light emitted from different positions of the light guide plate to the reflector sheet are different, and the intensities of light increase sequentially from the center of the light guide plate 40 to the periphery of the light guide plate 40. To ensure that the reflected light is white, the density of the yellow ink 303 is set based on the intensity of the light, and the density of the yellow ink 303 more proximal to the frame is larger.

When the reflector sheet 30 moves, the yellow ink 303 moves along with the reflector sheet 30. For example, when the reflector sheet 30 moves to the left, the yellow ink 303 also moves to the left. After moving, the light intensity corresponding to a yellow ink region on the right is decreased, which is equivalent to that the blue light passes through the yellow ink with the higher density and the light reflected by the yellow ink on the right presents yellow; the light intensity corresponding to a yellow ink region on the left is increased, which is equivalent to that the blue light passes through the yellow ink with the lower density and the light reflected by the yellow ink on the left presents blue. In the embodiments of the present disclosure, the first protrusion 301 can limit the movement of the reflector sheet 30, thereby alleviating such phenomenon well, and improving the display effect of the display panel.

Exemplarily, the yellow ink 303 may be coated on the reflector sheet 30.

Additionally, for a blue quantum dot backlight module, the first protrusion 301 can effectively prevent the yellow ink 303 at the periphery of the reflector sheet 30 from moving to an active area, thereby improving the display uniformity of the display panel.

As shown in FIG. 9, the first protrusion 301 and the second protrusion 302 are mainly configured to limit the movement of the reflector sheet 30. Therefore, the yellow ink 303 is generally not provided on the first protrusion 301 and the second protrusion 302.

Referring to FIG. 3 again, the backlight module further includes an optical film 50. The optical film 50 is disposed in the frame 102, and the light guide plate 40 is disposed between the reflector sheet 30 and the optical film 50.

In this implementation, the optical film 50 may recycle the light to improve the luminance, and the optical film 50 may also reflect the light to make the light distributed more uniformly on the light-emitting surface, thereby improving the display effect of the display panel.

Exemplarily, the optical film 50 may include a diffusion sheet, a luminance enhancement sheet, and the like.

In the embodiments of the present disclosure, the optical film 50, such that the optical film 50 may be placed within the frame 102.

In the backlight module according to the embodiments of the present disclosure, only the shape of the reflector sheet 30 is optimized, and manufacturing processes and materials are unchanged. Therefore, the manufacturing costs are not increased and manufacturing is easy to implement.

An embodiment of the present disclosure further provides a display panel. The display panel includes a display substrate and the backlight module shown in any of the above drawings.

Exemplarily, the display substrate includes an array substrate and a color filter substrate which are aligned, and a liquid crystal layer disposed between the array substrate and the color filter substrate. When the display panel displays, light emitted by the backlight module passes through the array substrate, the liquid crystal layer and the color filter substrate sequentially.

An embodiment of the present disclosure further provides a display apparatus. The display apparatus includes a power supply component and a display panel. The display panel is the display panel as described above, and the power supply component is configured to supply power for the display panel.

The display apparatus according to the embodiment of the present disclosure may be a liquid crystal display apparatus, an organic light-emitting diode display apparatus, or a quantum dot display device, or the like. In specific implementations, the display apparatus provided in the of embodiment of the present disclosure may be any product or component with a display function, such as a mobile phone, a tablet computer, a television, a display, a laptop computer, a digital photo frame or a navigator.

The descriptions above are merely optional embodiments of the present disclosure, and are not intended to limit the present disclosure. Any modifications, equivalent substitutions, improvements and the like made within the spirit and principles of the present disclosure should be included within the scope of protection of the present disclosure.

What is claimed is:

1. A backlight module, comprising:
a back plate, comprising a bottom plate and a frame surrounding the bottom plate;
at least one light bar, fixed on an inner sidewall of the frame, wherein a gap is formed between an end portion of the light bar and the inner sidewall of the frame in an extension direction of the light bar; and
a reflector sheet, disposed in the frame and on the bottom plate, wherein at least one first sidewall of the reflector sheet is provided with at least one first protrusion, the first protrusion being extended from the first sidewall on which the first protrusion is disposed towards an inner sidewall of the frame opposite to the first sidewall on which the first protrusion is disposed, and the first protrusion being disposed in the gap;
wherein a cutting seam is formed at a connection between the first protrusion and the first sidewall on which the first protrusion is disposed, wherein in a first direction, the cutting seam is extended from a side, proximal to the corresponding light bar, of the first protrusion to a middle of the first protrusion, the first direction being the extension direction of the light bar corresponding to the first protrusion.

2. The backlight module according to claim 1, wherein the first sidewall is provided with two first protrusions, and the light bar is disposed between the two first protrusions.

3. The backlight module according to claim 1, wherein in the first direction, a length of the cutting seam is smaller than a half of a first length of the first protrusion and greater than a third of the first length of the first protrusion.

4. The backlight module according to claim 1, wherein in the first direction, a first length of the first protrusion is greater than a maximum expansion value of the reflector sheet at a predetermined temperature, and the first protrusion and the light bar corresponding to the first protrusion are disposed at a same side of the reflector sheet.

5. The backlight module according to claim 1, wherein in a second direction, a second length of the first protrusion is smaller than a first distance, the first distance being a distance between a side, distal from the inner sidewall on which the light bar is disposed, of the light bar and the inner sidewall in the second direction;
wherein the second direction is perpendicular to the first direction, and parallel to a surface of the reflector sheet.

6. The backlight module according to claim 5, wherein the second length is greater than 1.2 mm.

7. The backlight module according to claim 4, wherein in the first direction, a distance between the first protrusion and the light bar ranges from 0.3 mm to 0.7 mm.

8. The backlight module according to claim 1, wherein a number of the light bar and a number of the first sidewall are both 1.

9. The backlight module according to claim 1, wherein the at least one light bar comprises a first light bar and a second light bar, the first light bar and the second light bar being disposed on inner sidewalls of two adjacent sides of the frame respectively; and
the at least one first sidewall comprises two adjacent and mutually-connected first sidewalls, the two first sidewalls being opposite to the first light bar and the second light bar respectively.

10. The backlight module according to claim 1, wherein at least one second sidewall of the reflector sheet is provided with a second protrusion facing the inner sidewall of the frame;
wherein the second protrusion and the first protrusion are disposed on different sidewalls.

11. The backlight module according to claim 10, wherein the second sidewall is provided with two second protrusions spaced apart.

12. The backlight module according to claim 10, wherein a distance between the second protrusion and the inner sidewall of the frame opposite to the second protrusion ranges from 0.3 mm to 0.7 mm, and the second protrusion and the inner sidewall of the frame opposite to the second protrusion are disposed at a same side of the reflector sheet.

13. The backlight module according to claim 1, further comprising:
a light guide plate, disposed in the frame, wherein the light guide plate, the reflector sheet and the bottom plate are laminated sequentially.

14. The backlight module according to claim 13, wherein the light bar is a blue light bar, and yellow ink is provided on a surface, facing the light guide plate, of the reflector sheet, the yellow ink being disposed at a periphery of the reflector sheet.

15. The backlight module according to claim 13, further comprising:
an optical film, disposed in the frame, wherein the light guide plate is disposed between the reflector sheet and the optical film.

16. The backlight module according to claim 15, wherein the optical film comprises at least one of a diffusion sheet and a luminance enhancement sheet.

17. The backlight module according to claim 1, further comprising:
a heat dissipation plate, disposed between the light bar and the inner sidewall of the frame facing the light bar.

18. A display panel, comprising a display substrate and a backlight module, wherein the backlight module comprises:
a back plate, comprising a bottom plate and a frame surrounding the bottom plate;
at least one light bar, fixed on an inner sidewall of the frame, wherein a gap is formed between an end portion of the light bar and the inner sidewall of the frame in an extension direction of the light bar; and
a reflector sheet, disposed in the frame and on the bottom plate, wherein at least one first sidewall of the reflector sheet is provided with at least one first protrusion, the first protrusion being extended from the first sidewall on which the first protrusion is disposed towards an inner sidewall of the frame opposite to the first sidewall on which the first protrusion is disposed, and the first protrusion being disposed in the gap;
wherein a cutting seam is formed at a connection between the first protrusion and the first sidewall on which the first protrusion is disposed, wherein in a first direction, the cutting seam is extended from a side, proximal to the corresponding light bar, of the first protrusion to a middle of the first protrusion, the first direction being the extension direction of the light bar corresponding to the first protrusion.

19. A display apparatus, comprising a power supply component and a display panel, wherein the display panel comprises a display substrate and a backlight module comprising:
a back plate, comprising a bottom plate and a frame surrounding the bottom plate;
at least one light bar, fixed on an inner sidewall of the frame, wherein a gap is formed between an end portion of the light bar and the inner sidewall of the frame in an extension direction of the light bar; and
a reflector sheet, disposed in the frame and on the bottom plate, wherein at least one first sidewall of the reflector sheet is provided with at least one first protrusion, the first protrusion being extended from the first sidewall on which the first protrusion is disposed towards an inner sidewall of the frame opposite to the first sidewall on which the first protrusion is disposed, and the first protrusion being disposed in the gap;
wherein the power supply component is configured to supply power for the display panel; and
a cutting seam is formed at a connection between the first protrusion and the first sidewall on which the first protrusion is disposed, wherein in a first direction, the cutting seam is extended from a side, proximal to the corresponding light bar, of the first protrusion to a middle of the first protrusion, the first direction being the extension direction of the light bar corresponding to the first protrusion.

* * * * *